(12) United States Patent
Alev et al.

(10) Patent No.: US 7,340,611 B2
(45) Date of Patent: Mar. 4, 2008

(54) TEMPLATE-DRIVEN XML DIGITAL SIGNATURE

(75) Inventors: Umut Alev, Redmond, WA (US); Eldar A. Musayev, Sammamish, WA (US); Ilia G. Ioffe, Bellevue, WA (US); Derek E. Denny-Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 10/352,527

(22) Filed: Jan. 28, 2003

(65) Prior Publication Data

US 2004/0148508 A1 Jul. 29, 2004

(51) Int. Cl.
*H04L 9/32* (2006.01)
(52) U.S. Cl. ........................ 713/180; 713/176
(58) Field of Classification Search ................ 713/180, 713/177; 705/75
See application file for complete search history.

(56) References Cited

U.S. PATENT DOCUMENTS

| | | | | |
|---|---|---|---|---|
| 6,601,172 | B1* | 7/2003 | Epstein | 713/178 |
| 2002/0040431 | A1* | 4/2002 | Kato et al. | 713/168 |
| 2002/0049906 | A1* | 4/2002 | Maruyama et al. | 713/716 |
| 2002/0069358 | A1* | 6/2002 | Silvester | 713/176 |
| 2002/0147911 | A1* | 10/2002 | Winkler et al. | 713/177 |
| 2003/0005305 | A1* | 1/2003 | Brickell | 713/177 |
| 2003/0009666 | A1* | 1/2003 | Jakobsson | 713/168 |
| 2003/0144873 | A1* | 7/2003 | Keshel | 705/1 |
| 2003/0212893 | A1* | 11/2003 | Hind et al. | 713/177 |

OTHER PUBLICATIONS

Eastlake, Donald 3rd, et al., "W3C XML Signature WG," http://www.w3.org/Signature, Sep. 9, 2002, 5 pages.
Simon, Ed, et al., "An Introduction to XML Digital Signatures," http://www.xml.com/lpt/a/2001/08/08/xmldsig.html, Aug. 8, 2001, 6 pages.
Mactaggart, Murdoch, "An Introduction to XML Encryption and XML Signature," http://www-106.ibm.com/developerworks/library/s-xmlsec.html, Sep. 25, 2001, 7 pages.
Bartel, Mark, et al., "XML-Signature Syntax and Processing," http://www.w3.org/TR/smldsig-core, Feb. 12, 2002, 64 pages.
Treese, Win, "XML, Web Services, and XML," Putting It Together, Sep. 2002, pp. 9-12.
Kudo, Michiharu, et al., "XML Document Security Based on Provisional Authorization," CCS'00, Athens, Greece, 2000, pp. 87-96.

(Continued)

*Primary Examiner*—Matthew B Smithers
(74) *Attorney, Agent, or Firm*—Woodcock Washburn LLP

(57) ABSTRACT

An XML digital signature standard is applied to an XML document to sign it. The XML digital signature is an XML fragment with a specified schema that includes (a) data to describe how the signature should be calculated (e.g., digest methods, filters, and data sources) and (b) actual signature data (e.g., digests and signature values). The data describing how the signature should be calculated (i.e., the "group (a)" data) is placed inside an XML digital signature template, which is then used (e.g., by an API (application programming interface)) to create the actual digital signature containing the "group (b)" data.

20 Claims, 3 Drawing Sheets

OTHER PUBLICATIONS

Devanbu, P., et al., "Flexible Authentication of XML Documents," CCS'01, Nov. 5-8, 2001, Philadelphia, Pennsylvania, pp. 136-145.

Suryanarayana, Lalitha, et al., "Profiles for the Situated Web," WWW 2002, May 7-11, 2002, Honolulu, Hawaii, pp. 200-209.

* cited by examiner

TEMPLATE-DRIVEN XML DIGITAL SIGNATURE

FIELD OF THE INVENTION

This invention relates in general to the field of message and signer authentication. More particularly, this invention relates to digital signatures.

BACKGROUND OF THE INVENTION

Authentication refers to the process that a recipient of an electronic message would follow to verify the integrity of the message as well as the identity of the sender. A digital signature is used in such authentication.

Conventionally, digital signatures are typically created and verified using public keys, and are used to identify authors or signers of electronic data. Digital signatures provide several features including (1) the ability to authenticate the identity of the signer of the data, (2) the ability to protect the integrity of the data, and (3) nonrepudiation which proves the identity of the parties that participated in the transaction.

There are various conventional techniques for verifying the authenticity of the signer and the integrity of the data. One may have to visit the web site of a third party certificate issuing authority and verify that the provided public key indeed belongs to the signer. The certificate issuing authority registers key owner credentials and therefore can verify whom the particular public key belongs to. Another technique to verify the signer identity is to compare the provided public encryption key to a trusted key already present in the computer. That trusted key could be obtained earlier by other means (e.g., delivered via ordinary mail, delivered as part of a separate encrypted email message, published in a newspaper, published on a secure web site, etc.).

As XML (extensible markup language) becomes a vital component of the emerging electronic business infrastructure, it is desirable to provide trustable, secure XML messages to form the basis of business transactions. The W3C (World Wide Web Consortium) has recommended applying digital signatures to XML.

One feature of XML digital signatures is the ability to sign only specific portions of the XML tree rather than the complete document. This is relevant when a single XML document may have a long history in which different components are authored at different times by different parties, each signing only those elements relevant to itself. This flexibility is also desirable in situations where it is important to ensure the integrity of certain portions of an XML document, while leaving open the possibility for other portions of the document to change. Consider, for example, a signed XML form delivered to a user for completion. If the signature were over the entire XML form, any change by the user to the default form values would invalidate the original signature.

An XML signature can sign more than one type of resource. For example, a single XML signature might cover character-encoded data (HTML), binary-encoded data (JPG), XML-encoded data, and a specific section of an XML file.

The components of a conventional XML signature are now described with respect to the exemplary elements shown below.

```
<Signature>
    <Signed Info>
        (Canonicalization Method)
        (Signature Method)
        (<Reference (URI=)?>
            (Transforms)?
            (Digest Method)
            (Digest Value)
        </Reference>)
    </Signed Info>
    (Signature Value)
    (Key Info)?
    (Object)
</Signature>
```

Each resource to be signed has its own <Reference> element, identified by an Uniform Resource Identifier (URI) attribute. The <Transform> element specifies an ordered list of processing steps that were applied to the referenced resource's content before it was digested. The <Digest Value> element carries the value of the digest of the referenced resource. The <Signature Value> element carries the value of the encrypted digest of the <Signed Info> element. The <Key Info> element indicates the key to be used to validate the signature. Possible forms for identification include certificates, key names, and key agreement algorithms and information.

To create a conventional XML signature, an initial step is to determine which resources are to be signed, by identifying the resources through a URI. For example, "http://www.abccompany.com/index.html" would reference an HTML page on the Web; "http://www.abccompany.com/logo.gif" would reference a GIF image on the Web; "http://www.abccompany.com/xml/po.xml" would reference an XML file on the Web; and "http://www.abccompany.com/xml/po.xml#sender1" would reference a specific element in an XML file on the Web.

Next, the digest of each resource is calculated. In XML signatures, each referenced resource is specified through a <Reference> element and its digest (calculated on the identified resource and not the <Reference> element itself) is placed in a <DigestValue> child element such as:

```
<Reference URI="http://www.abccompany.com/news/
2000/03_27_00.htm">
    <DigestMethod Algorithm="http://www.w3.org/2000/09/xmldsig#
    sha1" />
    <DigestValue>j61wx3rvEPO0vKtMup4NbeVu8nk=</DigestValue>
</Reference>
<Reference
URI="http://www.w3.org/TR/2000/WD-xmldsig-core-20000228/
signature-example.xml">
    <DigestMethod Algorithm="http://www.w3.org/2000/09/xmldsig#
    sha1"/>
    <DigestValue>UrXLDLBIta6skoV5/A8Q38GEw44=</DigestValue>
</Reference>
```

The <DigestMethod> element identifies the algorithm used to calculate the digest. A large number (i.e., the digest value) is then generated.

The reference elements are then collected (with their associated digests) within a <SignedInfo> element such as:

```
SignedInfo Id="foobar">
<CanonicalizationMethod
    Algorithm="http://www.w3.org/TR/2001/REC-xml-c14n-
    20010315"/>
<SignatureMethod Algorithm="http://www.w3.org/2000/09/
xmldsig#dsa-sha1" />
<Reference URI="http://www.abccompany.com/news/
2000/03_27_00.htm">
  <DigestMethod Algorithm="http://www.w3.org/2000/09/xmldsig#
  sha1" />
  <DigestValue>j6lwx3rvEPO0vKtMup4NbeVu8nk=</DigestValue>
</Reference>
<Reference
    URI="http://www.w3.org/TR/2000/WD-xmldsig-core-20000228/
    signature-example.xml">
    <DigestMethod Algorithm="http://www.w3.org/2000/09/xmldsig#
    sha1"/>
    <DigestValue>UrXLDLBIta6skoV5/A8Q38GEw44=</
    DigestValue>
  </Reference>
</SignedInfo>
```

The <CanonicalizationMethod> element indicates the algorithm that was used to canonize the <SignedInfo> element. Different data streams with the same XML information set may have different textual representations, e.g., differing as to whitespace. To help prevent inaccurate verification results, XML information sets are first be canonized before extracting their bit representation for signature processing. The <SignatureMethod> element identifies the algorithm used to produce the signature value.

The digest of the <SignedInfo> element is then calculated and that digest is signed and the signature value is put in a <SignatureValue> element, as shown below, for example.

```
<SignatureValue>MC0E LE=</SignatureValue>
```

If keying information is to be included, it is placed in a <KeyInfo> element. As shown below, the keying information contains the X.509 certificate for the sender, which would include the public key needed for signature verification.

```
<KeyInfo>
  <X509Data>
    <X509SubjectName>CN=EdSimon,O=XMLSec Inc.,
    ST=OTTAWA, C=CA
      </X509SubjectName>
    <X509Certificate>MIID5jCCA0+gA...1VN</X509Certificate>
  </X509Data>
</KeyInfo>
    The <SignedInfo>, <SignatureValue>, and <KeyInfo>
    elements are placed into a
<Signature> element, shown below. The <Signature> element
comprises the XML signature.
<?xml version="1.0" encoding="UTF-8"?>
<Signature xmlns="http://www.w3.org/2000/09/xmldsig#">
<SignedInfo Id="foobar">
<CanonicalizationMethod
    Algorithm="http://www.w3.org/TR/2001/REC-xml-c14n-
    20010315"/>
<SignatureMethod
    Algorithm="http://www.w3.org/2000/09/xmldsig#dsa-sha1" />
<Reference URI="http://www.abccompany.com/news/
2000/03_27_00.htm">
<DigestMethod Algorithm="http://www.w3.org/2000/09/xmldsig#
sha1" />
<DigestValue>j6lwx3rvEPO0vKtMup4NbeVu8nk=</DigestValue>
```

-continued

```
</Reference>
<Reference
    URI="http://www.w3.org/TR/2000/WD-xmldsig-core-
    20000228/signature-example.xml">
<DigestMethod Algorithm="http://www.w3.org/2000/09/xmldsig#
sha1"/>
<DigestValue>UrXLDLBIta6skoV5/A8Q38GEw44=</DigestValue>
</Reference>
</SignedInfo>
<SignatureValue>MC0E~LE=</SignatureValue>
<KeyInfo>
<X509Data>
<X509SubjectName>CN=Ed Simon,O=XMLSec Inc.,ST=OTTAWA,
C=CA
    </X509SubjectName>
<X509Certificate>
MIID5jCCA0+gA...1VN
</X509Certificate>
</X509Data>
</KeyInfo>
</Signature>
```

The XML digital signature is an XML fragment with specified schema, which includes (a) data to describe how the signature should be calculated (e.g., digest methods, filters, data sources, etc.) and (b) actual signature data (e.g., digests and signature value). A conventional XML digital signature implementation requires a program to specify the "group (a)" data through program calls, and then generates a signature element with both the "group (a)" and "group (b)" data. Such an implementation is computation extensive, thereby requiring a lot of valuable processor resources and time.

In view of the foregoing, there is a need for systems and methods that overcome the limitations and drawbacks of the prior art.

SUMMARY OF THE INVENTION

The present invention is directed to systems and methods for creating an XML digital signature that is then applied to an XML document to sign it. The XML digital signature is an XML fragment with a specified schema that includes (a) data to describe how the signature should be calculated (e.g., digest methods, filters, and data sources) and (b) actual signature data (e.g., digests and signature values). Specifically, the data describing how the signature should be calculated (i.e., the "group (a)" data) is placed inside an XML digital signature template, which is then used (e.g., by an API (application programming interface)) to create the actual digital signature containing the "group (b)" data.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

A digital signature template stores data (e.g., digest methods, filters, data sources, etc.) to describe how a digital signature should be calculated. An application then calls an XML digital signature generator to create a digital signature for an XML document. The XML digital signature generator uses the template along with actual signature data (e.g., digests and signature values, determined based on the data in the template and the XML document itself) to create the digital signature.

Exemplary Computing Environment

Figure 1:
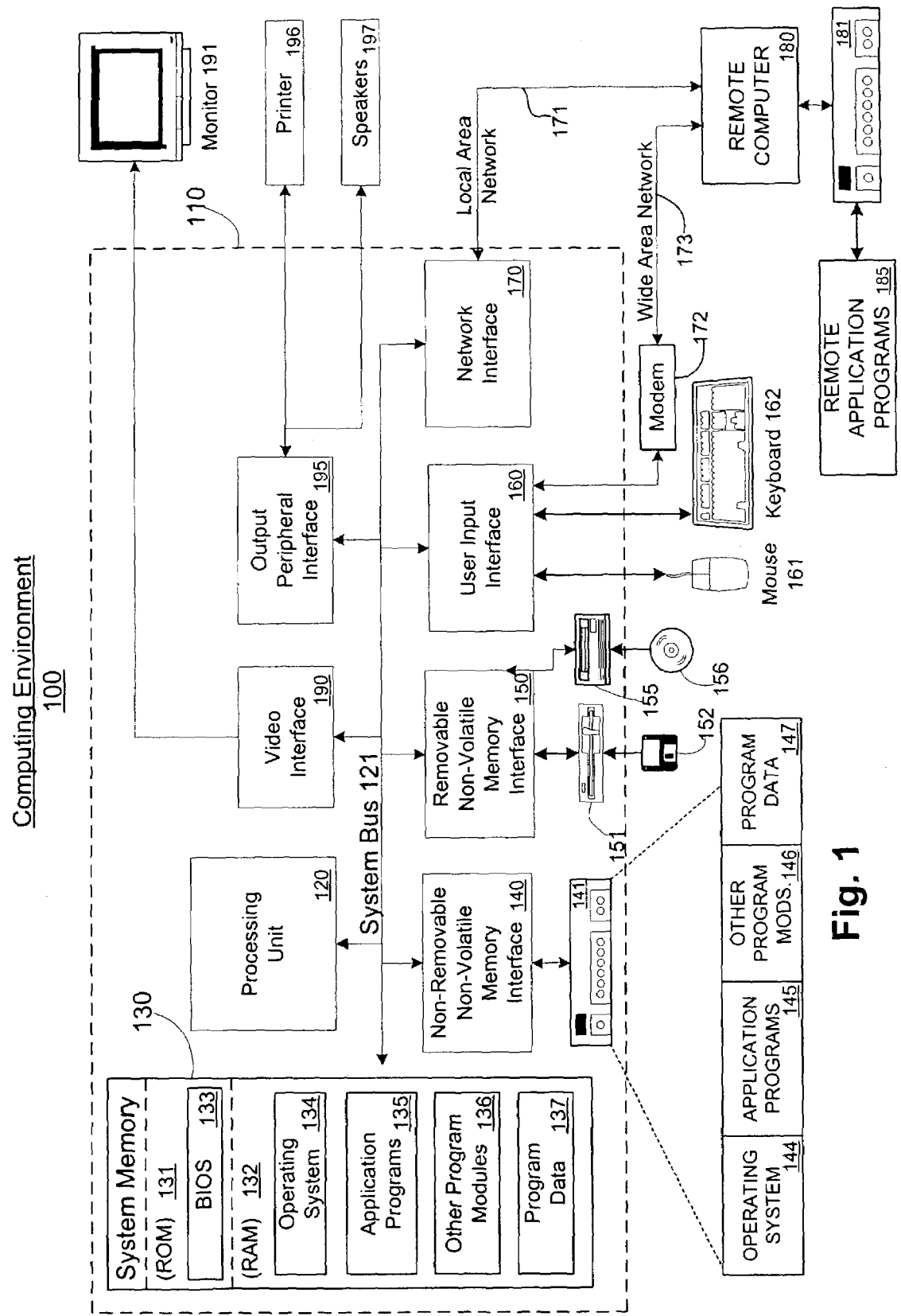
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes volatile and non-volatile media, as well as removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

Figure 2:
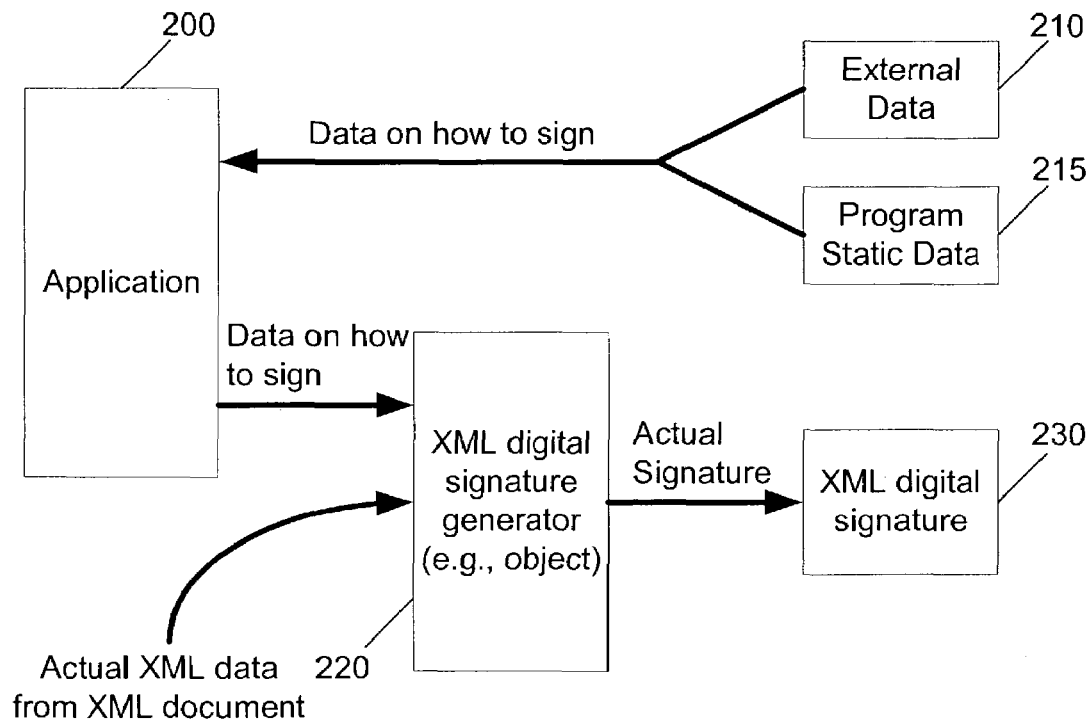
FIG. 2 is a diagram of a conventional XML digital signature implementation.

FIG. 2 is a diagram of a conventional XML digital signature implementation. When an application 200 makes a call or receives a command to digitally sign an XML document, the application 200 retrieves external data 210 and program static data 215 by looping through a large amount of code for each reference that is to be signed, as described above. The data 210, 215 includes data to describe how the signature should be calculated (e.g., digest methods, filters, data sources, etc.). The application 200 provides this data to the XML digital signature generator 220. The digital signature generator 220 then performs the conventional steps to create signed information (i.e., the actual signature data), using the data 210, 215 along with data from the XML document to be signed. If there are additional references to be signed, the steps are repeated. When all of the references have been created, a key is created. The information is signed with the key, and the signed information is stored as an XML digital signature 230.

Figure 3:
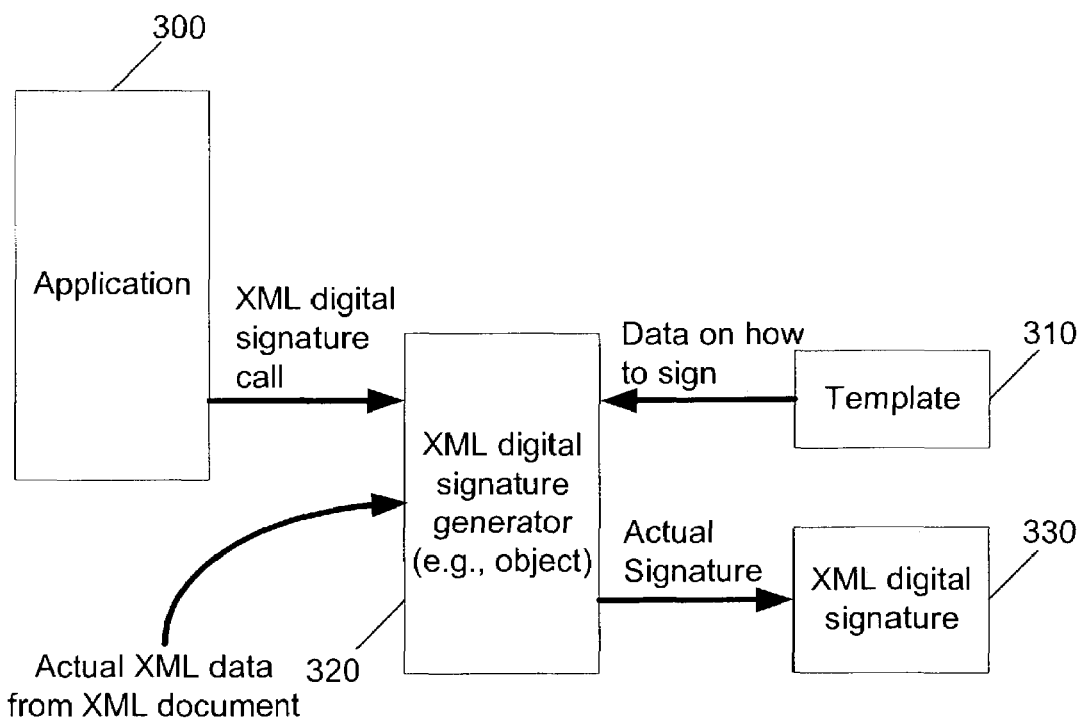
FIG. 3 is a diagram of an exemplary XML digital signature implementation in accordance with the present invention.

FIG. 3 is a diagram of an exemplary XML digital signature implementation in accordance with the present invention. According to an embodiment of the present invention, a template 310 stores data to describe how the signature should be calculated (i.e., "group (a)" data, e.g., digest methods, filters, data sources, etc.). This template is generated and stored prior to its use in creating an XML digital signature. When an application 300 makes a call or receives a command to digitally sign an XML document, the application 300 passes this call command to the XML digital signature generator 320. The digital signature generator 320 retrieves the template 310 and uses the information from the template, along with data from the XML document to be signed, to create information that is signed with a key and then stored as an XML digital signature 330.

An exemplary template is given below. The exemplary template is used for signing data and preferably has no digest or signature values. When the template is called, the XML digital signature generator 320 fills in the blank or empty fields with actual signature data (e.g., digests and signature value ("group (b)" data)) in the template to create a digital signature. The actual signature data ("group (b)" data) is determined using the template data ("group (a)" data) and the actual XML data to be signed. When signing, information on applicable transforms, signature, digest and canonicalization methods (e.g., C14N, XSLT, enveloped signature) is retrieved from the template and then used.

```
<Signature xmlsn=="http://www.w3.org/2000/09/
    xmldsig#" >
    <Signed Info>
        <CanonicalizationMethod
            Algorithm="http://www.w3.org/TR/2001/REC-xml-
            c14n-20010315"/>
        <SignatureMethod Algorithm="this will be replaced by
            the sign method" />
        <Reference URI="http://my.org/location1">
            <Transforms>
                <Transform
                    Algorithm="http://www.w3.org/TR/2001/
                    REC-xml-c14n-20010315"/>
                </Transform>
            </Transforms>
        <Reference URI="http://my.org/location2">
            <Transforms>
                <Transform
                    Algorithm="http://www.w3.org/TR/2001/
                    REC-xml-c14n-20010315"/>
                </Transform>
            </Transforms>
            <DigestMethod Algorithm="http://www.w3.org/2000/09/
                xmldsig#sha1" />
            <DigestValue/>
        </Reference>
    </SignedInfo>
    <SignatureValue/>
    <KeyInfo>
        optional
    </KeyInfo>
</Signature>
```

Figure 4:
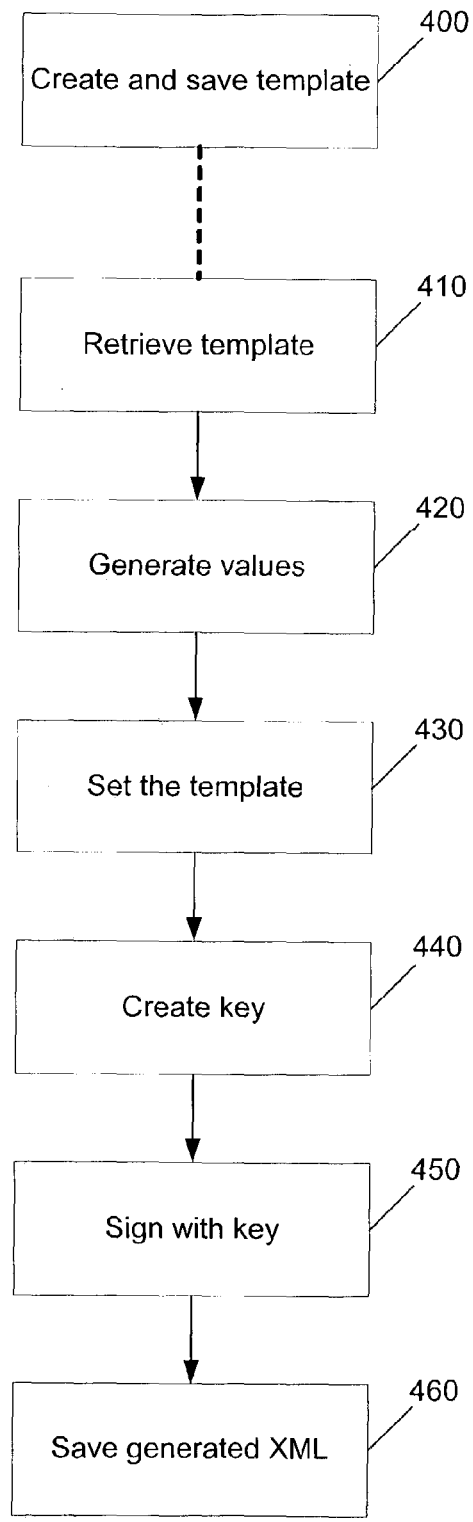
FIG. 4 is a flowchart of an exemplary method of generating a digital signature element in accordance with the present invention.

FIG. 4 is a flowchart of an exemplary method of generating a digital signature element in accordance with the present invention. When an XML digital signature is called (via an object for example), the application retrieves the XML digital signature template. This template already contains the data describing how the XML digital signature should be calculated (digest methods, filters, data sources), but is missing the actual digital signature. The template also contains empty elements, which are subsequently filled with the actual digital signature data. After the template is filled in with actual signature data, the application requests the digital signature generator to sign data sources.

Thus, the digital signature generator uses the template to determine what steps and methods should be performed, and fills out actual signature data in the template based on these steps and methods. As a result, the template, after being filled in with the data, is essentially a signature element that can be signed to become a valid XML digital signature. The application does not have to redundantly repeat all the information that is contained in the template. Moreover, the application is more efficient, because it does not have to loop through the code every time for each reference to be signed. Instead of making a series of calls, it goes to the already partially filled-in template.

In particular, at step 400, a template is initially generated and stored for subsequent retrieval and use. At step 410, a call is made for an XML digital signature to be generated for an XML document and the template is retrieved.

The signature template contains all the fields, including optional fields, that the application expects in a final signature element (such as canonicalization method, digest method, transform, and other elements), with the exception of the content for signature method, digest value, signature value, and the optional element key info, which will be subsequently determined by the digital signature generator. The digital signature generator discards the contents of any existing values of the content for signature method, digest value, signature value, and the optional element key info, if present, and newly determines their actual values at step 420, based on the existing data (e.g., digest methods, filters, and data sources) and the data in the actual document to be signed.

At step 430, the template is set. In other words, the blank or empty fields in the template are filled in. Because the template already has the data to describe how the signature should be calculated (e.g., digest methods, filters, and data sources), the XML digital signature generator only needs to fill out the actual signature data (e.g., digests and signature values) based on the data in the template and the document being signed. As a result, most of preliminary code to apply the XML digital signature is eliminated, thereby significantly reducing the number of steps and thus the cost involved.

The digest values for all reference elements in the signature template are retrieved (calculated or retrieved using earlier computed or stored values) and inserted into the appropriate digest value elements of the signature element. If the data source was not specified, then the data is preferably determined using the URI attribute of the reference element.

The W3 has promulgated various digest methods (e.g., SHA-1), various signature methods (e.g., DSA with SHA1, RSA with SHA1, and HMAC with SHA1), and various canonicalization methods. These methods can be used in accordance with the present invention.

After the <signed info> element is filled, the signature value is calculated (e.g., per W3 specifications with the application of desired transforms, canonicalizations, etc.) and inserted into the signature value element. The digest value and signature value elements are provided in the template. Actual computation of the digest value is preferably performed according to W3 specifications.

At step 440, a key is created. A key can be created by based on a cryptographic service provider (CSP), a base 64 encoded HMAC secret value, a non-encoded/binary HMAC secret value, from a certificate context, or a key value node of a signature element in the template, for example. At step 450, the information is signed with the key to create an XML digital signature, which is then stored at step 460. In particular, the signature element is signed with the key to create the XML digital signature.

As mentioned above, while exemplary embodiments of the present invention have been described in connection with various computing devices and network architectures, the underlying concepts may be applied to any computing device or system in which it is desirable to create and/or implement digital signatures. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of generating a digital signature for a document comprising:
   receiving a template comprising first information including data to describe how the digital signature should be calculated at a digital signature generator from a data storage device;
   generating second information including actual signature data based on the first information;
   storing the second information in the template;
   creating a key;
   signing the first information and the second information with the key to provide the digital signature; and
   storing the digital signature in the template.

2. The method of claim 1, further comprising generating the template and storing the template in the data storage device prior to receiving the template.

3. The method of claim 1, wherein receiving the template comprises:
   receiving a call at the digital signature generator from an application for the digital signature; and
   retrieving the template from the data storage device.

4. The method of claim 1, wherein receiving the template having first information comprises receiving the template comprising at least one digest method and at least one canonicalization method.

5. The method of claim 1, wherein generating the second information based on the first information comprises generating a digest value and a signature value.

6. The method of claim 1, further comprising generating a signature element comprising the first information and the second information, wherein signing the first information and the second information comprises signing the signature element with the key.

7. The method of claim 1, wherein generating the second information is based on the first information and the document.

8. A computer-readable storage medium having stored thereon computer-executable instructions for performing a method of generating a digital signature for a document, the method comprising:
   receiving a template comprising first information including data to describe how the digital signature should be calculated at a digital signature generator from a data storage device;
   generating second information including actual signature data based on the first information;
   storing the second information in the template;
   creating a key;
   signing the first information and the second information with the key to provide the digital signature; and
   storing the digital signature in the template.

9. The computer-readable storage medium of claim 8, having further computer-executable instructions for generating the template and storing the template in the data storage device prior to receiving the template.

10. The computer-readable storage medium of claim 8, wherein receiving the template comprises:
    receiving a call at the digital signature generator from an application for the digital signature; and
    retrieving the template from the data storage device.

11. The computer-readable storage medium of claim 8, wherein receiving the template having first information comprises receiving the template comprising at least one digest method and at least one canonicalization method.

12. The computer-readable storage medium of claim 8, wherein generating the second information based on the first information comprises generating a digest value and a signature value.

13. The computer-readable storage medium of claim 8, having further computer-executable instructions for generating a signature element comprising the first information and the second information, wherein signing the first information and the second information comprises signing the signature element with the key.

14. The computer-readable storage medium of claim 8, wherein generating the second information is based on the first information and the document.

15. A computer-readable storage medium having stored thereon computer-executable instructions for performing a method of generating a digital signature for a document, the method comprising:

receiving a template comprising first data including data to describe how the digital signature should be calculated;

generating second data comprising a digest value and a signature value and including actual signature data;

storing the second data in the template;

providing the digital signature based on the first data and the second data; and storing the digital signature in the template.

16. The computer-readable storage medium of claim 15, wherein the first data comprises at least one digest method and at least one canonicalization method.

17. The computer-readable storage medium of claim 15, wherein the second data is based on the first data.

18. The computer-readable storage medium of claim 15, wherein the template comprises empty data fields corresponding to the second data for use in calculating the digital signature, the second data subsequently determined based on the first data and stored in the empty data fields.

19. The computer-readable storage medium of claim 18, wherein the first data and the second data are signed with a key to become the digital signature.

20. The computer-readable storage medium of claim 15, wherein the digital signature is in an extensible markup language (XML) data format.

* * * * *